United States Patent [19]

South et al.

[11] Patent Number: 4,704,761
[45] Date of Patent: Nov. 10, 1987

[54] WIPER ARM WITH SLIDING CAP

[75] Inventors: Alan South, Willingham; Alan Kenney, Over, both of England

[73] Assignee: Champion Spark Plug Europe S.A., Binche, Belgium

[21] Appl. No.: 882,484

[22] Filed: Jul. 7, 1986

[30] Foreign Application Priority Data

Jul. 10, 1985 [FR] France .................................. 85 10565

[51] Int. Cl.⁴ ............................ B60S 1/04; B60S 1/34
[52] U.S. Cl. .................................. 15/250.19; 15/250.34
[58] Field of Search ............. 15/250.19, 250.2, 250.31, 15/250.34, 250.35

[56] References Cited

U.S. PATENT DOCUMENTS

| | | | |
|---|---|---|---|
| 2,226,358 | 12/1940 | Sibley | 15/250.34 |
| 2,736,053 | 2/1956 | Oishei et al. | 15/250.19 |
| 4,170,804 | 10/1979 | Scotcher. | |

FOREIGN PATENT DOCUMENTS 2326183 5/1973 Fed. Rep. of Germany .
2511013 9/1976 Fed. Rep. of Germany .

*Primary Examiner*—Peter Feldman
*Attorney, Agent, or Firm*—Wood, Dalton, Phillips, Mason & Rowe

[57] ABSTRACT

A wiper arm comprising a mounting head, a channel which is rotatably attached to the mounting head and a cap for the mounting head. The cap has two extensions with recesses therein for cooperating with projections on the channel to selectively maintain the channel in each of two positions relative to the mounting head.

12 Claims, 8 Drawing Figures

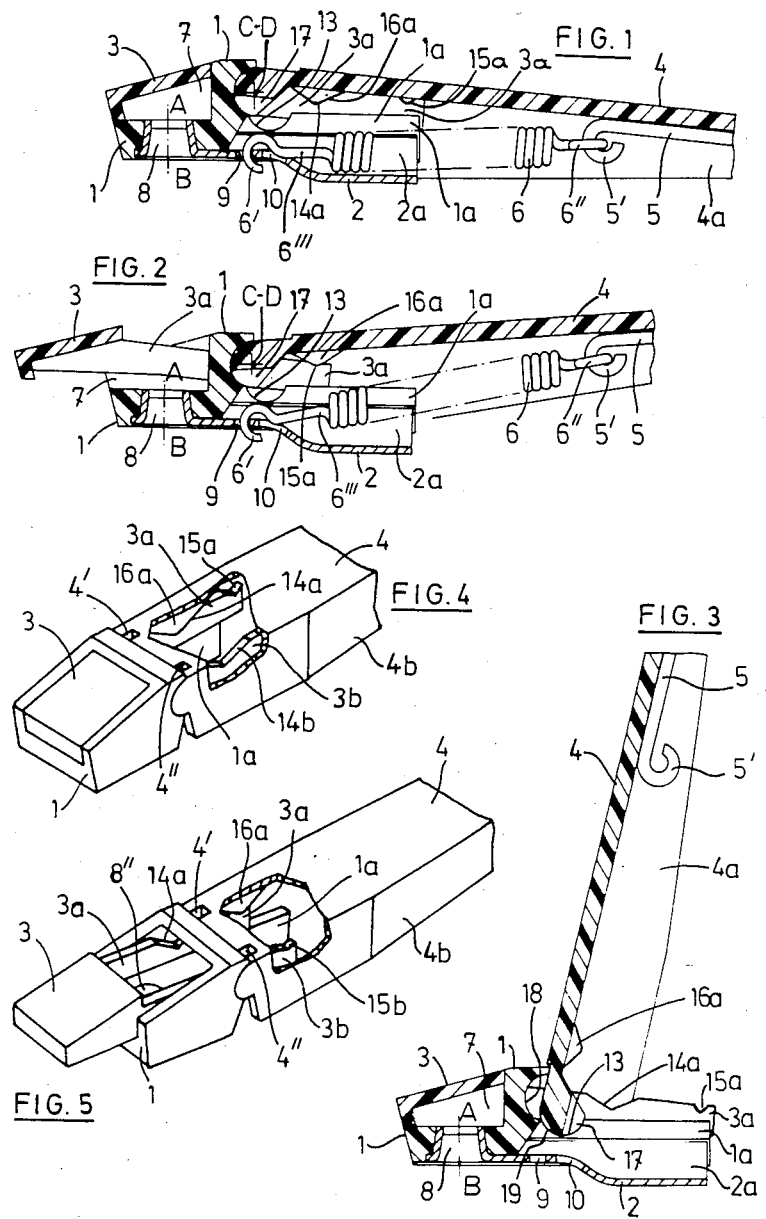

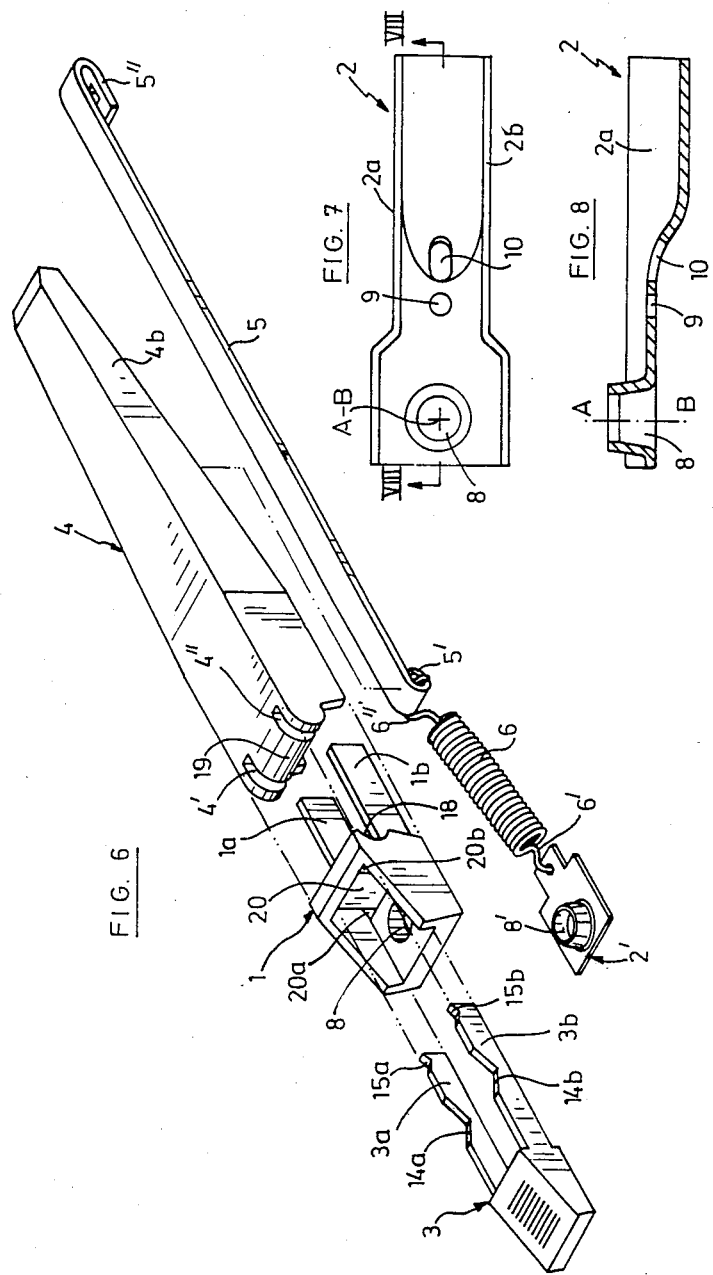

WIPER ARM WITH SLIDING CAP

TECHNICAL FIELD

The present invention relates to a wiper arm, in particular for motor vehicles, comprising a mounting head provided with a cap and a channel which is rotatably attached to the mounting head.

BACKGROUND ART

Wiper arms of the described above type are well known in the prior art and German (DE) patent applications No. 23 26 183 and No. 25 11 013 are examples of such structure. The main disadvantage of the wiper arms disclosed in said two patent applications, i.e. of the conventional wiper arms, is their relatively high production cost, cost which is mainly due: (a) to the fact that they necessitate the assembly of numerous parts; (b) to the complexity of certain parts; and (c) to the necessary use of relatively expensive materials such as, for example, special alloys for the mounting head.

The complexity of the conventional wiper arms is also due to the fact that the articulation between the mounting head and the channel is accomplished by means of a rivet. This requires the assembly of several supplementary parts, as can be seen in FIG. 2 of the German patent application No. 23 26 183.

Also the caps described in the two above mentioned German patent applications, and generally most conventional caps, are relatively fragile. Thus, the removable cap of the German patent application No. 23 26 183 often breaks at the articulation between the mounting head and the channel.

DISCLOSURE OF THE INVENTION

The main object of the present invention is to provide a wiper arm which eliminates the disadvantages of the above mentioned conventional arms and, therefore, essentially, to provide a low cost wiper arm. This object is obtained by a new, substantially simplified design and by use of more plastic materials than in prior art structures.

Another object of the invention is to provide a wiper arm wherein a cap of a mounting head not only covers the attachment structure, which connects the mounting head to a drive shaft of the assembly wiper arm/wiper blade, but which also is capable of locking a channel on the arm in at least two positions with respect to the mounting head.

To this end the wiper arm according to the invention is substantially characterized by the fact that the cap of the mounting head is provided with two extensions, extending substantially parallel to the longitudinal extent of the wiper arm and beyond structure allowing articulation between the mounting head and the channel, and that said extensions of the cap are provided with means for locking the channel in at least two different positions with respect to the mounting head.

Another characteristic of the wiper arm according to the invention is the fact that the articulation between the mounting head and the channel consists of a semi-cylindrical recess in the mounting head, which semi-cylindrical recess cooperates with a corresponding semi-cylindrical surface provided on the channel.

BRIEF DESCRIPTION OF THE DRAWINGS

The invention will be better understood when reading the following description of one embodiment of the invention in conjunction with the appended drawings, wherein:

FIG. 1 is a fragmentary sectional view along the length of a wiper arm according to the invention and having a cap, a channel and a mounting head;

FIG. 2 is a view similar to that in FIG. 1 wherein the cap and the channel are in a different position with respect to the mounting head than in FIG. 1;

FIG. 3 is a view similar to that in FIG. 1 wherein the channel is in a different position with respect to the mounting head than in FIGS. 1 and 2;

FIG. 4 is a fragmentary perspective view of the wiper arm wherein the different elements of the wiper arm are in the same position as in FIG. 1;

FIG. 5 is a fragmentary perspective view of the wiper arm wherein the different elements of the wiper arm are in the same position as in FIG. 2;

FIG. 6 is an exploded perspective view of the wiper arm according to the invention;

FIG. 7 is an enlarged top view of one of the elements of the wiper arm according to the invention; and FIG. 8 is a sectional view along line VIII—VIII of the element in FIG. 7.

BEST MODE FOR CARRYING OUT THE INVENTION

As shown in FIGS. 1, 2 and 3 a wiper arm according to the invention essentially comprises:

- a mounting head 1 provided with a base plate 2 and a cap 3, which cap is capable of sliding in a direction substantially parallel to the longitudinal axis of the wiper arm;
- a channel 4 provided with lateral walls 4a, 4b and with an extension rod 5 at a free end of which are provided means 5" (FIG. 6) for attaching thereto a wiper blade; and
- a helical spring 6 (not shown in FIG. 3) which links the base plate 2 of the mounting head 1 to the extension rod 5 of the channel 4.

As already indicated above, the channel 4 can take different positions with respect to the mounting head 1. In other words, the channel 4 can rotate with respect to the mounting head 1. For the relative positions of the mounting head 1 and the channel 4 shown in FIGS. 1 and 2 (and consequently in FIGS. 4 and 5) the channel 4 rotates about a theoritical axis C-D.

Articulation between the mounting head 1 and the channel 4 is accomplished through a semi-cylindrical recess 18 (FIG. 3) provided in the mounting head 1, in which recess a correspondingly shaped semi-cylindrical surface 19 (FIG. 3) on the channel 4 is fit. The extension rod 5 and the channel 4 can thus rotate slightly with respect to the mounting head 1. Such small rotational movements are necessary for maintaining the wiper blade firmly on a windshield under the action of the helical spring 6.

When the channel 4 is pushed manually into the position of FIG. 3, which position is necessary for the windshield to be cleaned by hand, the semi-cylindrical surface 19 of the channel 4 jumps out of the recess 18 of the mounting head 1. This position of the channel 4 is a stable position because in the FIG. 3 position the connecting points 5', 9 of the helical spring 6 are positioned in such a way that the spring urges the channel in a couterclockwise direction (in FIG. 3).

As can be seen best in FIG. 6, but also in FIGS. 1 through 5, the mounting head 1 comprises, on the side of the semi-cylindrical recess 18, two extensions 1a, 1b, which extend, when the wiper arm is assembled, substantially parallel to the longitudinal axis of the wiper arm, inside the channel 4 and beyond the recess 18 and surface 19.

Each of the two extensions 1a, 1b of the mounting head 1 is provided with a semi-cylindrical recess 13 (FIG. 3) capable of receiving the semi-cylindrical surface 19 of the channel 4 when said channel is in the position shown in FIG. 3. This structure reinforces the stability of the channel 4 in this position. It is furthermore to be noted that when the channel 4 is in the position of FIG. 3, the straight portion 6''' of the helical spring 6 is located in a slot 17 provided in the central and lower portion of the semi-cylindrical surface of the channel 4.

Just as the mounting head 1, the cap 3 also comprises two extensions 3a, 3b extending substantially parallel to the longitudinal extent of the wiper arm, beyond the recess 18 and surface 19 and between the mounting head 1 and the channel 4. Each of the two extensions 3a, 3b of the cap 3 comprises two recesses 14a, 15a and 14b, 15b, respectively, of different dimension. Said recesses are the means for locking the channel 4 in each of two different positions with respect to the mounting head 1.

To the locking means 14a, 15a of the cap 3 correspond locking means on the channel 4. Said locking means on the channel 4 comprise projections 16a and 16b capable of cooperating respectively with the four recesses 14a, 15a and 14b, 15b of the cap 3. As can be seen in the drawings, the recesses 14a, 15a and 14b, 15b as well as the corresponding projections 16a and 16b may, for example, have a triangular shape.

FIGS. 1, 2; 4 and 5 show that the cap 3 can take different positions with respect to the mounting head 1. In fact the cap 3 can slide from its position in FIGS. 2 and 5 to its position in FIGS. 2 and 4. To permit this the wall 20 (FIG. 6) of the mounting head 1 is provided with two openings 20a, 20b through which the two extensions 3a, 3b of the cap 3 pass.

In FIGS. 2 and 5 the cap 3 and the channel 4 are in a mounting position, i.e. in the position wherein said two elements are when the wiper arm is ready for being mounted onto a vehicle. In this position the triangular projections 16a and 16b of the channel 4 respectively cooperate with the triangular recesses 15a and 15b of the extensions 3a, 3b of the cap 3.

In FIGS. 1 and 4 the cap 3 and the channel 4 are in a working position of the wiper arm. In this position the triangular projections 16a and 16b of the channel 4 cooperate respectively with the triangular recesses 14a and 14b of the extensions 3a, 3b of the cap 3.

It is to be noted that when the cap 3 is being mounted onto the wiper arm, extensions 3a, 3b not only pass through the openings 20a, 20b provided in the mounting head 1, but also through slots 4', 4'' provided in the semi-cylindrical surface 19 of the channel 4.

The mounting position (FIG. 2) is a stable position since, in spite of the action of the spring 6, the channel 4 is locked through the recesses 15a, 15b on the extensions 3a, 3b of the cap 3. The same is true for the working position (FIG. 1) wherein the channel 4 is locked through the recesses 14a, 14b on the extensions 3a, 3b of the cap 3.

When comparing FIG. 1 with FIG. 2 it can be seen that in FIG. 2 (mounting position) the channel 4 is at a predetermined angle with respect to the base plate 2 of the mounting head 1. This is advantageous when the wiper arm is being mounted on a vehicle because a free end 5'' of the extension rod 5 of the channel 4 will not touch the windshield at that moment. The difference in the position of the channel 4 in FIG. 2 and FIG. 1 is due to the fact that the recesses 15a, 15b and the recesses 14a, 14b of the extensions 3a, 3b of the cap 3 have different depths, with the recesses 15a, 15b being shallower than the recesses 14a, 14b.

FIGS. 1, 2, 3, 7 and 8 show a first variations of the base plate for the mounting head 1. Said base plate 2 comprises an opening 8 which has a frustoconical configuration for receiving drive shaft for the wiper arm. In the drawings said drive shaft is represented by its geometrical axis A-B. The drive shaft, which is well known in the prior art, has a threaded top portion which penetrates a space 7 between the cap 3 and the mounting head 1 and onto which a nut is screwed for rigidly attaching the mounting head 1 to the drive shaft. When mounting the base plate 2 onto the mounting head 1, the portion of the plate which forms the opening 8 is inserted from beneath into a circular opening 8'' provided in the mounting head 1.

The base plate 2 also has attached thereto the helical spring 6 by means of a hook 6' which is hooked at the opening 9 of the base plate 2 and which opening provides a passage for a portion of the extremity 6''' of the helical spring 6. At its other extremity 6' the helical spring 6 is attached to a hook 5' of the extension rod 5 of the channel 4. It is to be noted that the base plate has a substantially U-shaped transverse section with a web and with side walls 2a, 2b.

FIG. 6 shows a simplified version 2' of the base plate of the mounting head. The base plate 2' comprises only a simple, flat sheet and an opening 8' which has which has a frustoconical shape. The base plate 2' is also used in the wiper arms shown in FIGS. 4 and 5.

In FIG. 6, all the elements of a wiper arm according to the invention are represented. The elements 3, 1 and 4 all fit one into the other and they are principally made of a plastic material. On the other hand, the elements 2', 6 and 5, which are inserted from beneath into the above mentioned elements 3, 1 and 4, are made principally of steel.

We claim:

1. A wiper arm, in particular for motor vehicles and having a longitudinal extent, said wiper arm comprising: a mounting head (1); a cap (3); a channel (4); articulation means for rotatably attaching the channel to the mounting head (1), said cap (3) having two extensions (3a, 3b) extending substantially parallel to the longitudinal extent of the wiper arm, beyond said articulation means attaching the mounting head (1) and the channel (4); and means (14a, 15a and 14b, 15b) on the extensions (3a, 3b) for locking the channel (4) in at least two different positions with respect to the mounting head (1).

2. A wiper arm according to claim 1, characterized in that on the channel (4) there are provided locking means (16a, 16b) for cooperating with the locking means (14a, 15a and 14b, 15b) provided on the extensions (3a, 3b) of the cap (3).

3. A wiper arm according to claim 2, characterized in that the locking means provided on the extensions (3a, 3b) of the cap (3) consist of two recesses (15a, 15b) having first dimensions and for maintaining a first locking position of the channel (4) and of two other recesses (14a, 14b), having dimensions larger than the first dimensions, for maintaining a second position of the channel (4).

4. A wiper arm according to either of claims 2 or 3, characterized in that the locking means on the channel (4) consist of two projections (16a and 16b) capable of cooperating with the four recesses (14a, 15a and 14b, 15b) of the extensions (3a, 3b) of the cap (3).

5. A wiper arm according to claim 4, characterized in that the recesses (14a, 15a and 14b, 15b) of the extensions (3a, 3b) of the cap (3) have a triangular shape, said channel (4) has projections (16a, 16b) and the projections have a triangular shape.

6. A wiper arm according to claim 1, characterized in that means mount the cap (3) of the mounting head (1) movably sliding in a direction substantially parallel to the longitudinal extent of the wiper arm and that said means mounting the cap comprises two openings (20a, 20b) through which the two extensions (3a, 3b) of the cap (3) pass.

7. A wiper arm according to claim 1, characterized in that the articulation means between the mounting head (1) and the channel (4) consists of a semi-cylindrical recess (18) in the mounting head (1), which semi-cylindrical recess (18) is capable of cooperating with a corresponding semi-cylindrical surface (19) provided on the channel (4).

8. A wiper arm according to claim 7, characterized in that the semi-cylindrical surface (19) of the channel (4) is provided with two slots (4', 4'') through which the two extensions (3a, 3b) of the cap (3) can pass.

9. A wiper arm according to claim 7, characterized in that the mounting head (1) comprises two extensions (1a, 1b) extending substantially parallel to the longitudinal extent of the wiper arm, beyond said articulation means between the mounting head (1) and the channel (4), and further characterized in that said extensions (1a, 1b) of the mounting head (1) are each provided with a semi-cylindrical recess (13) capable of receiving said semi-cylindrical surface (19) of the channel (4).

10. A wiper arm according to claim 1 wherein the mounting head (1) comprises a base plate (2, 2') and wherein the channel (4) comprises an extension rod (5) at a free end of which are provided connecting means for connecting thereto a wiper blade, characterized in that the base plate (2, 2') of the mounting head (1) is linked to the extension rod (5) of the channel (4) by a helical spring (6).

11. A wiper arm according to claim 10, characterized in that the mounting head (1) and its base plate (2, 2') are made in one piece.

12. A wiper arm according to claim 10, characterized in that the mounting head (1), the cap (3) and the channel (4) are made of a plastic material and that the base plate (2, 2') of the mounting head (1), the helical spring (6) and the extension rod (5) of the channel (4) are made of steel.

* * * * *

UNITED STATES PATENT AND TRADEMARK OFFICE
CERTIFICATE OF CORRECTION

PATENT NO. : 4,704,761

DATED : November 10, 1987

INVENTOR(S) : South et al.

It is certified that error appears in the above-identified patent and that said Letters Patent is hereby corrected as shown below:

Column 3, line 37, change "2" to --1--

Column 4, line 59, after "15" insert --a--

Signed and Sealed this

Twelfth Day of April, 1988

Attest:

DONALD J. QUIGG

Attesting Officer      Commissioner of Patents and Trademarks